United States Patent [19]
Wade et al.

[11] Patent Number: 5,359,630
[45] Date of Patent: Oct. 25, 1994

[54] METHOD AND APPARATUS FOR REALIGNMENT OF SYNCHRONOUS DATA

[75] Inventors: Paul C. Wade, Shirley; David J. Sager, Acton, both of Mass.; Andrey Varpahovsky, Rochester, Minn.

[73] Assignee: Digital Equipment Corporation, Maynard, Mass.

[21] Appl. No.: 929,623

[22] Filed: Aug. 13, 1992

[51] Int. Cl.$^5$ .............................. H04L 7/04
[52] U.S. Cl. ............................ 375/106; 375/111
[58] Field of Search ............. 375/106, 107, 111, 119, 375/38; 370/100.1, 105.2; 371/1, 47.1; 307/269

[56] References Cited

U.S. PATENT DOCUMENTS

| | | | |
|---|---|---|---|
| 3,622,885 | 11/1971 | Kruszynski et al. | 325/40 |
| 4,119,796 | 10/1978 | Jones | 178/69 |
| 4,404,680 | 9/1983 | Perkins | 375/111 |
| 4,430,745 | 2/1984 | Betts | 375/25 |
| 4,637,018 | 1/1987 | Flora et al. | 371/1 |
| 4,641,318 | 2/1987 | Addeo | 375/38 |
| 4,642,791 | 2/1987 | Mallozzi et al. | 364/900 |
| 4,656,612 | 4/1987 | Allan | 365/203 |
| 4,692,932 | 9/1987 | Denhez et al. | 375/107 |
| 4,694,291 | 9/1987 | Denhez et al. | 340/825.2 |
| 4,694,294 | 9/1987 | Suzuki et al. | 340/825.14 |
| 4,700,347 | 10/1987 | Rettberg et al. | 371/1 |
| 4,707,842 | 11/1987 | Fisher | 375/110 |
| 4,714,924 | 12/1987 | Ketzler | 340/825.21 |
| 4,754,164 | 6/1988 | Flora et al. | 307/269 |
| 4,771,441 | 9/1988 | Spengler et al. | 375/106 |
| 4,779,093 | 10/1988 | Watkins | 340/825.57 |
| 4,782,499 | 11/1988 | Clendening | 375/113 |
| 4,811,364 | 3/1989 | Sagar et al. | 375/106 |
| 4,881,165 | 11/1989 | Sagar et al. | 364/200 |
| 4,885,485 | 12/1989 | Leake et al. | 307/542 |
| 4,979,190 | 12/1990 | Sagar et al. | 375/106 |
| 5,115,455 | 5/1992 | Samaras et al. | 375/106 |

FOREIGN PATENT DOCUMENTS 0213641 3/1987 European Pat. Off. ...... H04L 25/14

OTHER PUBLICATIONS

H. M. Rein et al., Electronic Letters, "3.8 Gbit/s Bipolar Master/Slave D-Flip-Flop IC as a Basic Element for High-Speed Optical Communication Systems," vol. 22, No. 10, (May 8, 1986) pp. 543–544.

*Primary Examiner*—Stephen Chin
*Assistant Examiner*—T. Ghebretinsae
*Attorney, Agent, or Firm*—Albert P. Cefalo; Denis G. Maloney; Mark J. Casey

[57] ABSTRACT

A method and device for receiving data in a synchronous communication system. Data can be accurately transferred between two subsystems in a synchronous system even where the clock skew and propagation delay between the two subsystems is unlimited. The receiving subsystem is initialized to ensure synchronous data transfer over a theoretically infinite range. The transmitting subsystem transmits data and a forwarded clock to the receiving subsystem. Data is captured in three state devices arranged in parallel to eliminate minimum delay requirements and to expand data valid time. The captured data is then aligned to the clock of the receiving subsystem by controlling a multiplexer which selects the proper state device output to pass to another state device for alignment to the receiving subsystem's clock. The multiplexer is controlled by a circuit which monitors the capturing of the incoming data and determines the correct state device output to select for proper data alignment.

27 Claims, 5 Drawing Sheets

| CURRENT STATE | | | INIT | | NEXT STATE | | | |
|---|---|---|---|---|---|---|---|---|
| Q0 | Q1 | Q2 | I0 | I1 | Q0 | Q1 | Q2 | |
| 0 | 0 | 1 | 1 | 1 | 1 | 0 | 0 | ⎫ |
| 0 | 1 | 0 | 1 | 1 | 0 | 0 | 1 | ⎬ FREE-RUNNING STATES |
| 1 | 0 | 0 | 1 | 1 | 0 | 1 | 0 | ⎭ |
| X | X | X | 0 | 0 | 1 | 0 | 0 | ⎫ |
| X | X | X | 0 | 1 | 0 | 1 | 0 | ⎬ INITIALIZATION STATES |
| X | X | X | 1 | 0 | 0 | 0 | 1 | ⎭ |

FIG.5

| EN | A | B | C | X | Y |
|---|---|---|---|---|---|
| 1 | 0 | 0 | 0 | 0 | 1 |
| 1 | 0 | 0 | 1 | 0 | 0 |
| 1 | 0 | 1 | 0 | 1 | 1 |
| 1 | 0 | 1 | 1 | 1 | 0 |
| 1 | 1 | 0 | 0 | 1 | 0 |
| 1 | 1 | 0 | 1 | 1 | 1 |
| 1 | 1 | 1 | 0 | 0 | 0 |
| 1 | 1 | 1 | 1 | 0 | 1 |
| 0 | X | X | X | 1 | 1 |

FIG. 4

| RECEIVING DATA LATCH | STATUS CODE GENERATOR OUTPUT | | |
|---|---|---|---|
| | SC0 | SC1 | SC2 |
| A | 1 | 0 | 0 |
| B | 1 | 1 | 0 |
| C | 1 | 1 | 1 |
| A | 0 | 1 | 1 |
| B | 0 | 0 | 1 |
| C | 0 | 0 | 0 |

FIG. 6

METHOD AND APPARATUS FOR REALIGNMENT OF SYNCHRONOUS DATA

FIELD OF THE INVENTION

The present invention relates to data communication between subsystems in a digital computer system. More specifically, the present invention relates to a method and apparatus for accurately transmitting data between two synchronous subsystems even where the clock skew or propagation delay between the two subsystems is greater than one clock cycle.

BACKGROUND OF THE INVENTION

In low speed synchronous data communication systems, clock skew or propagation delay between subsystems is negligible relative to the data cycle time. In such systems, data sequentially transmitted at low speed from a first subsystem is stable long enough to allow a skewed clock to capture the data in a state device of a second subsystem while meeting the setup and hold time requirements of the state device.

At higher data rates, however, clock skew becomes an increasingly important factor. As the data rate increases, the amount of time each transmitted data unit is stable decreases. The minimum period of time for which data must be stable to ensure accurate transmission, depends on the amount of skew and the setup and hold times of the receiving state device. In conventional systems, the data is typically stable for at most one clock cycle. It is thus not possible to guarantee accurate data transfer if the clock skew or propagation delay between two subsystems exceeds one clock cycle.

Systems allowing high speed synchronous data communication between subsystems where the clock skew can exceed an entire clock cycle are disclosed in U.S. Pat. Nos. 4,811,364, 4,979,190, and 5,115,455, each of which is assigned to the Digital Equipment Corporation. Generally, in the systems disclosed therein, data synchronous to a first clock, is transferred from a transmitting subsystem to a receiving subsystem. The operation of the receiving subsystem is synchronous with a second clock which is local to the receiving subsystem. The first and second clocks are typically generated by a common clock generator. Although they are assumed to have a fixed frequency relationship, the two clocks are assumed to have an unknown phase relationship by virtue of being subjected to different and unknown path delays.

In one embodiment, the first clock is forwarded with the data. The receiving subsystem uses the forwarded clock to capture each data bit received in one of two or more parallel state devices. Where there are N such parallel state devices, each is selected in a rotating order to capture every Nth bit of incoming data and to hold it for N cycles. The outputs of each state device, being thus stretched, are then sampled in the same rotational order in which the state devices are selected to capture the incoming data bits. The sampling is synchronous with the local clock of the receiving subsystem. Having been stretched to N cycles, each data bit received is thus held stable long enough to be accurately sampled using the local clock which can be skewed and delayed up to N cycles relative to the forwarded clock.

Delay and skew greater than N cycles, however, cannot be tolerated without increasing circuit complexity proportionately. Since the propagation delay for a signal is generally proportional to distance travelled, such synchronous data transmission systems thus have a theoretically finite operating range which depends on the value of N.

SUMMARY OF THE INVENTION

The present invention provides a method and apparatus for the transfer of data between subsystems in a synchronous system where the clock skew and delay between subsystems is theoretically unlimited. As such, synchronous data transfer over a theoretically infinite range is possible with the present invention.

Generally, the present invention comprises a transmitting subsystem and a receiving subsystem coupled by a data path and a forwarded clock path. The transmitting subsystem comprises circuitry for generating and driving data onto the data path and for driving a clock, synchronous with the data, onto the forwarded clock path. The receiving subsystem comprises a receiving circuit for receiving data from the transmitting subsystem and adapting it for use by the receiving subsystem. The operation of the receiving subsystem is synchronous with its own local clock. The forwarded and local clocks are typically generated by a common-clock source. Although the two clocks are assumed to have a known frequency relationship, they are assumed to have an unknown, but substantially constant, phase relationship by virtue of being subjected to unknown, but substantially constant, path delays. The receiving circuit of the present invention allows data synchronous with the forwarded clock to be realigned to the local lock even where the skew and delay between the two clocks is unlimited.

The receiving circuit of the present invention comprises three state devices arranged in parallel, first and second rotating logic blocks, a multiplexer, a data receiving state device, a status code generator, a synchronizer, and a state prediction logic block. The rotating logic blocks can, for example, be ring counters. Incoming data is captured by the three parallel state devices. The capturing of data by the parallel state devices is controlled by the first rotating logic block which is clocked by the forwarded clock. The first rotating logic block produces three output signals which are coupled respectively to a clock input of each of the parallel state devices. Each output of the first rotating logic block clocks its respective state device every third transition of the forwarded clock. Every third bit of the incoming data is thereby sequentially captured, in a rotating order, by each of the parallel state devices and held for three bit periods.

The outputs of the parallel state devices are coupled to the inputs of the multiplexer. The output of the multiplexer is coupled to the data receiving state device which is clocked by the local clock of the receiving subsystem. The selection inputs of the multiplexer are coupled to the outputs of the second rotating logic block which is clocked by the local clock. Under the control of the second rotating logic block, the data captured by the parallel state devices is sequentially selected by the multiplexer in a rotating order to pass to the input of the data receiving state device. Because the phase relationship between the forwarded and local clocks is unknown, there is an uncertainty of up to one bit period as to when the multiplexer selects a parallel state device output for sampling. By stretching each bit of incoming data to three bit periods, however, sufficient margin is provided to accommodate this uncertainty.

Accurate data transfer is achieved by guaranteeing that the output of each of the parallel state devices is stable when it is selected by the multiplexer. To guarantee this stability, the present invention keeps the rotational capturing of incoming data by the parallel state devices substantially synchronous with the rotational sampling of their outputs. This is achieved by providing a circuit for properly initializing the two rotating logic blocks to ensure accurate data realignment to the local clock.

As the first rotating logic block selects a parallel state device to capture an incoming data bit, the status code generator generates a code which uniquely indicates which of the parallel state devices is currently capturing data. As each code is generated, it is passed through the synchronizer which synchronizes the code to the local clock. The synchronized codes are then passed to the state prediction logic block which, during the initialization process, initializes the second rotating logic block in accordance with the status of the first rotational sequence as indicated by the synchronized status code. The second rotating logic block is initialized so that the multiplexer selects a parallel state device output while it is stable. Upon termination of the initialization process, the two rotating logic blocks proceed with the phase relationship established during initialization. Assuming that the phase relationship between the forwarded and local clocks remains substantially constant, the multiplexer will be guaranteed to select each parallel state device output while they are stable, thus satisfying the setup and hold times of the receiving state device. The received data is in alignment with the local clock of the receiving subsystem when captured by the data receiving state device.

DETAILED DESCRIPTION

Figure 1:
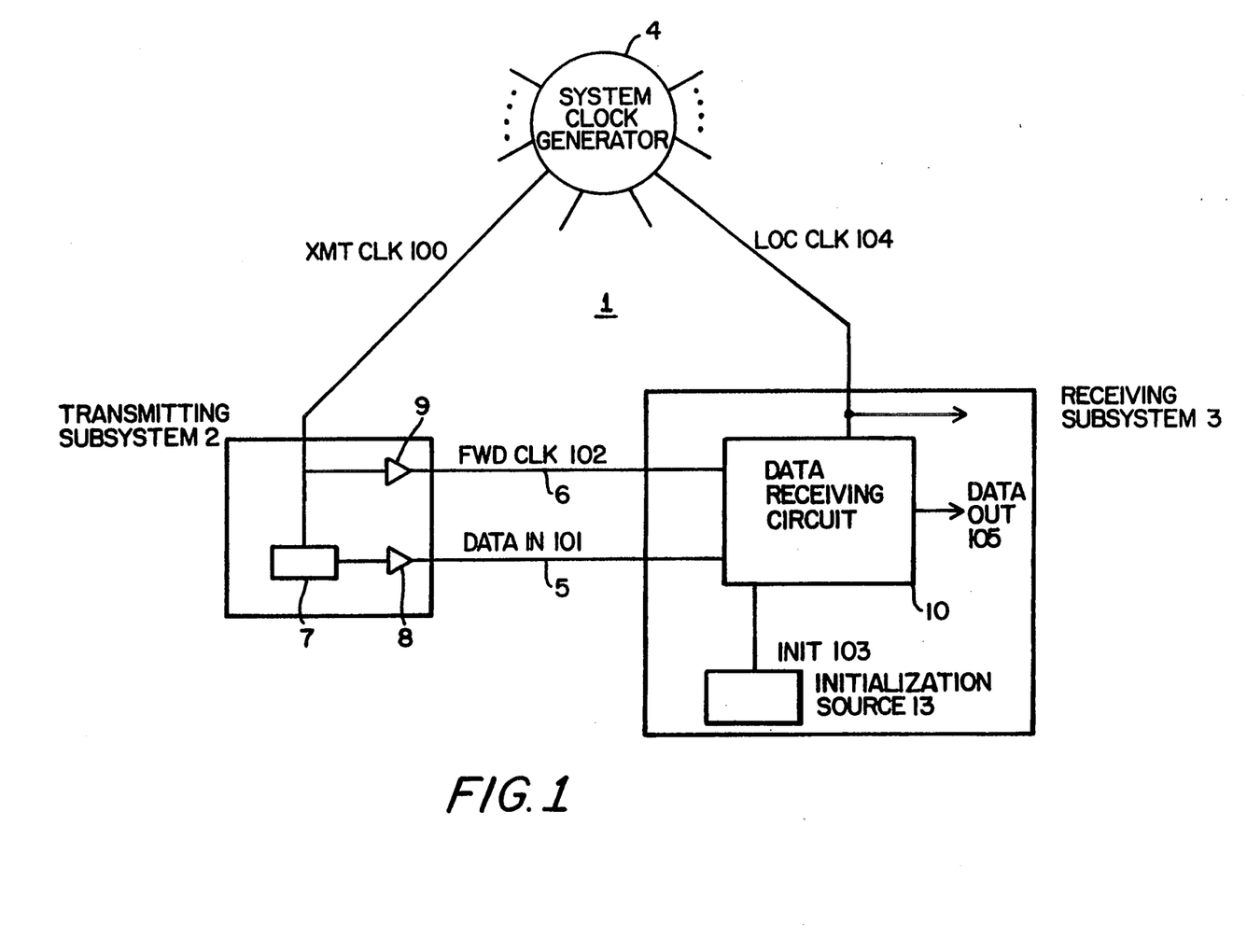
FIG. 1 is a block diagram of the system of the present invention.

Referring to the drawings, FIG. 1 illustrates the synchronous system 1 of the present invention in block diagram form. System 1 comprises a transmitting subsystem 2 and a receiving subsystem 3 which are both clocked by a system clock generator 4. The transmitting subsystem 2 and the receiving subsystem 3 are coupled by a path 5, carrying a data signal DATA IN 101, and a path 6, carrying a forwarded clock signal FWD CLK 102.

The transmitting subsystem 2 comprises a data generation circuit 7 for generating data to be transmitted to the receiving subsystem 3. A driver 8 drives the data signal DATA IN 101, onto the data path 5, and a driver 9 drives FWD CLK 102 onto the forwarded clock path 6. As generated at the transmitting subsystem 2, transitions of FWD CLK 102 indicate the midpoint between bit boundaries of the data on DATA IN 101. The system clock generator 4 provides a clock signal XMT CLK 100 to the transmitting subsystem 2 from which FWD CLK 102 is derived and from which the data generation circuit 7 is clocked. The system clock generator 4 also provides a clock signal LOC CLK 104 to the receiving subsystem 3. LOC CLK 104 is a clock signal of a frequency that is a multiple of the frequency of FWD CLK 102. In the exemplary embodiment, LOC CLK 104 is twice the frequency of FWD CLK 102. Due to unknown inherent delays in their respective paths, however, FWD CLK 102 and LOC CLK 104 have an unknown, but substantially constant, phase relationship at the receiving subsystem 3.

The data path 5 and forwarded clock path 6 are arranged to have similar delays. Matching these delays ensures that the relative timing of the DATA IN 101 and FWD CLK 102 signals is maintained in propagating from the transmitting subsystem 2 to the receiving subsystem 3. As will be discussed below, keeping the phase relationship between these two signals within a fixed range is necessary to ensure accurate data capture.

In the exemplary embodiment, one bit of data is transferred by DATA IN 101 for each transition of FWD CLK 102. This maximizes the data transfer rate for a given frequency of FWD CLK 102, or as a corollary, minimizes the frequency of FWD CLK 102 for a given data transfer rate. As such, the driver 9 in the transmitting subsystem can be a physically smaller device. Moreover, this makes it possible to match the driving device for FWD CLK 102, driver 9, with that used to drive DATA IN 101, driver 8. This in turn helps in matching the delays experienced by DATA IN 101 and FWD CLK 102 in propagating from the transmitting subsystem 2 to the receiving subsystem 3.

As seen in FIG. 1, the receiving subsystem 3 further comprises a data receiving circuit 10 and an initialization source 13. The data receiving circuit 10 receives the data signal 101, which is aligned to FWD CLK 102, and realigns it to the receiving subsystem's local clock, LOC CLK 104. The signal DATA OUT 105 is the reconstructed data output stream which consists of the DATA IN 101 signal synchronized to LOC CLK 104. DATA OUT 105 is output to the rest of the receiving subsystem 3.

Initialization source 13 generates an initialization signal INIT 103 which is used to initialize the data receiving circuit 10 to ensure proper data transfer in accordance with the present invention. INIT 103 would typically be asserted upon start-up of the communication link or upon loss of synchronization between the transmitting and receiving subsystems. In the latter case, the initialization source 13 could be a bit-error detection circuit which would assert INIT 103 whenever bit errors are detected.

Figure 2:
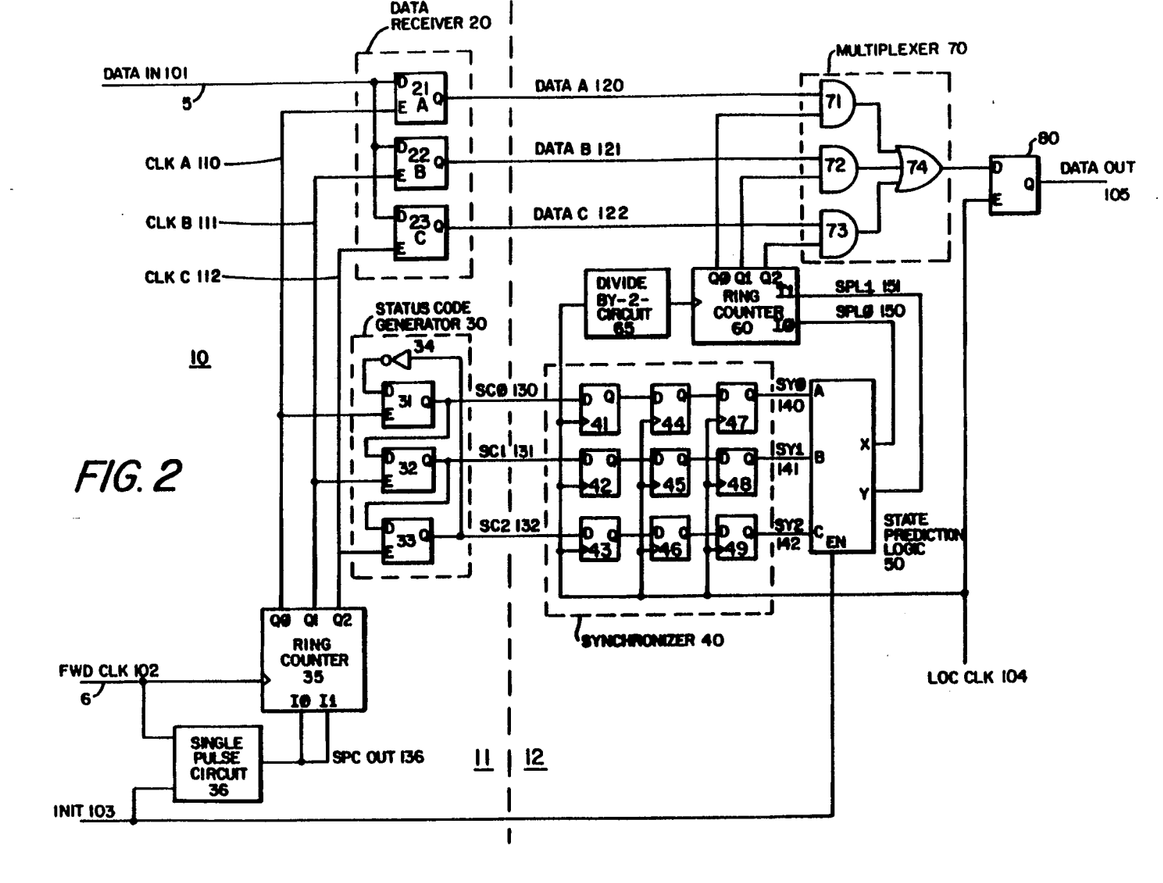
FIG. 2 is a schematic representation of the data receiving circuit of the present invention.

FIG. 2 illustrates, in a schematic diagram, an exemplary embodiment of the data receiving circuit 10 in the receiving subsystem 3. The major elements and their interconnections will first be discussed, followed by a more detailed functional description.

The receiving circuit 10 can logically be divided into a first subcircuit 11, clocked by FWD CLK 102, and a second subcircuit 12, clocked by LOC CLK 104. Generally, data entering subcircuit 11 via the data path 5, is captured, stretched, and presented, along with timing information, to the subcircuit 12. During initialization, the subcircuit 12 uses the timing information to determine the optimal timing for sampling the stretched data presented by the subcircuit 11. Once initialization is completed, the subcircuit 12 proceeds to operate with the optimal timing established during initialization.

As seen in FIG. 2, the subcircuit 11 comprises a data receiver 20, a status code generator 30, a first rotating logic block, i.e., ring counter 35, and a single pulse circuit 36. The subcircuit 12 comprises a synchronizer 40, state prediction logic 50, a second rotating logic block, i.e., ring counter 60, a divide-by-2 circuit 65, a multiplexer 70 and a state device 80. In the exemplary embodiment, the ring counters 35 and 60 are of the same design.

The data receiver 20 comprises three parallel latches 21, 22, and 23, respectively labelled A, B, and C. Incoming data on path 5 is coupled to data inputs of the latches 21–23. The latch enable, or clocking inputs of the latches 21, 22, and 23 are coupled, respectively, to the Q0, Q1, and Q2 outputs of the ring counter 35. The latch clocking signals are labelled, respectively, CLK A 110, CLK B 111, and CLK C 112. Each of the latches 21–23 is alternately selected by the ring counter 35 to capture every third bit of data received and to hold it for three bit periods. The latch 21, 22, and 23 output signals, which represent the captured and stretched data bits, are labelled respectively, DATA A 120, DATA B 121, and DATA C 122. These signals are passed to the subcircuit 12 for sampling.

Figure 3:
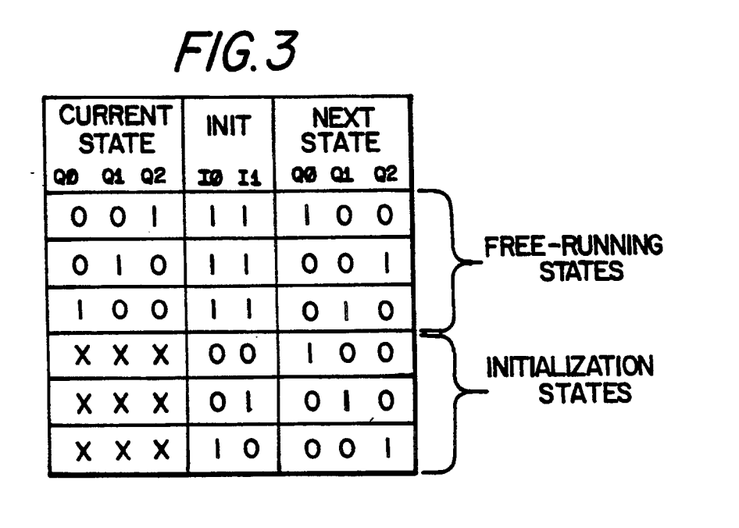
FIG. 3 is a truth table describing the operation of the rotating logic blocks used in the receiving circuit of the present invention.

The ring counter 35 has a clock input and two initialization inputs, I0 and I1, for initializing the ring counter 35 to one of three states. FIG. 3 shows a truth table describing the operation of the ring counters 35 and 60. It should be noted that in the exemplary embodiment, the ring counters 35 and 60 are double-edge triggered; i.e., changes in state occur on both edges of the clock input. Using the double-edge triggered ring counter 35 makes it possible to receive one bit of data for each transition of the forwarded clock. The clock input of the ring counter 35 is coupled to FWD CLK 102 and the initialization inputs I0 and I1 are both coupled to the output of the single pulse circuit 36. INIT 103 and FWD CLK 102 are coupled to the inputs of the single pulse circuit 36. When INIT 103 is first asserted, the single pulse circuit 36 generates a pulse which initializes the ring counter 35 to a known state. As the ring counter 35 clocks data receiver 20, it also clocks the status code generator 30.

Figure 4:
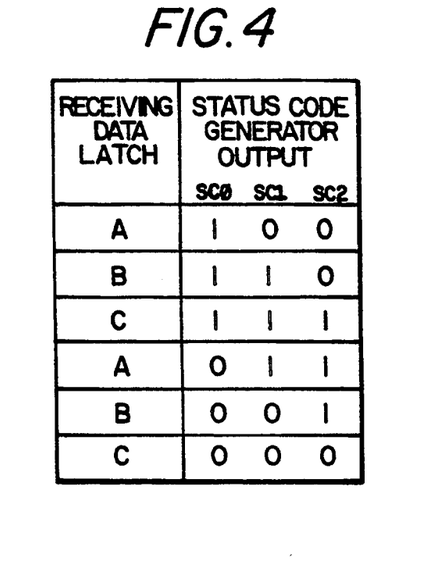
FIG. 4 is a table describing the operation of the status code generator in the circuit of the present invention.

The status code generator 30 comprises an inverter 34 and latches 31, 32, and 33. The Q0, Q1, and Q2 outputs of the ring counter 35 are also coupled, respectively, to the latch enable inputs of the latches 31, 32, and 33. As the ring counter 35 clocks the data receiver latches 21–23, it simultaneously clocks the status code generator latches 31–33. FIG. 4 shows a table indicating the states assumed by the status code generator outputs, SC0 130, SC1 131, and SC2 132, while each of the latches 21–23 is in the process of capturing data. The output signals of the status code generator, SC<0:2> 130–132, provide the timing information used by the subcircuit 12 to optimize its sample timing. These signals must first be synchronized to the local clock by the synchronizer 40.

The synchronizer 40 comprises three cascaded ranks of D-type flip-flops 41–49. The outputs of the status code generator latches 31–33 are coupled to the data inputs of the flip-flops 41–43. The outputs of the flip-flops 41–43 are coupled to the data inputs of the flip-flops 44–46. The outputs of the flip-flops 44–46 are coupled to the data inputs of the flip-flops 47–49. The clock inputs of all the synchronizer flip-flops 41–49, are coupled to and controlled by the local clock LOC CLK 104. The synchronizer 40 thus synchronizes the states of the status code generator outputs SC<0:2> to the local clock.

Figure 5:
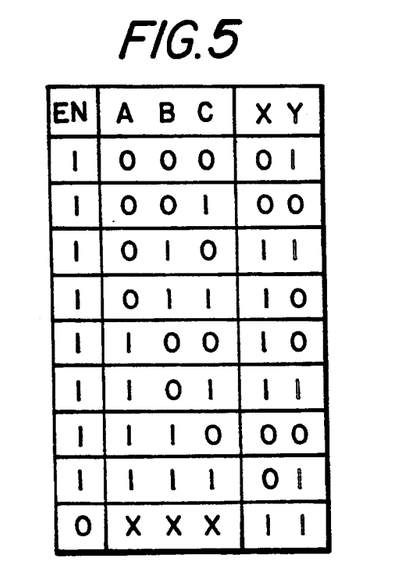
FIG. 5 is a truth table describing the operation of the state prediction logic in the circuit of the present invention.

The outputs of the flip-flops 47–49, SY<0:2> 140–142, are coupled, respectively, to inputs A, B, and C of the state prediction logic 50. An enable input EN of state prediction logic 50 is coupled to INIT 103 and outputs X and Y are coupled, respectively, to initialization inputs I0 and I1 of the ring counter 60. FIG. 5 shows a truth table describing the operation of the state prediction logic 50. During initialization, the state prediction logic 50 intializes the ring counter 60 in accordance with the synchronized timing information from subcircuit 11.

LOC CLK 104 is also coupled to the input of the divide-by-2 circuit 65. The divide-by-2 circuit 65 divides the frequency of the LOC CLK 104 signal in half. The output of the divide-by-2 circuit 65 is coupled to the clock input of the ring counter 60.

The multiplexer 70 comprises AND gates 71, 72, and 73 and OR gate 74. The Q0, Q1, and Q2 outputs of the ring counter 60 are coupled, respectively, to one input each of the AND gates 71–73. The other inputs of the AND gates 71, 72, and 73 are coupled, respectively, to the outputs of the latches 21, 22, and 23. The outputs of the AND gates 71, 72, and 73 are coupled to the inputs of the OR gate 74. The output of the OR gate 74 is coupled to a data input of the latch 80. Under the control of the ring counter 60, the multiplexer 70 selects one of the latch 21–23 outputs and presents it to the latch 80 whose latch enable input is coupled to LOC CLK 104. The output of latch 80 is the DATA OUT 105 signal. Transitions of DATA OUT 105 are thus synchronized with LOC CLK 104.

Figure 6:
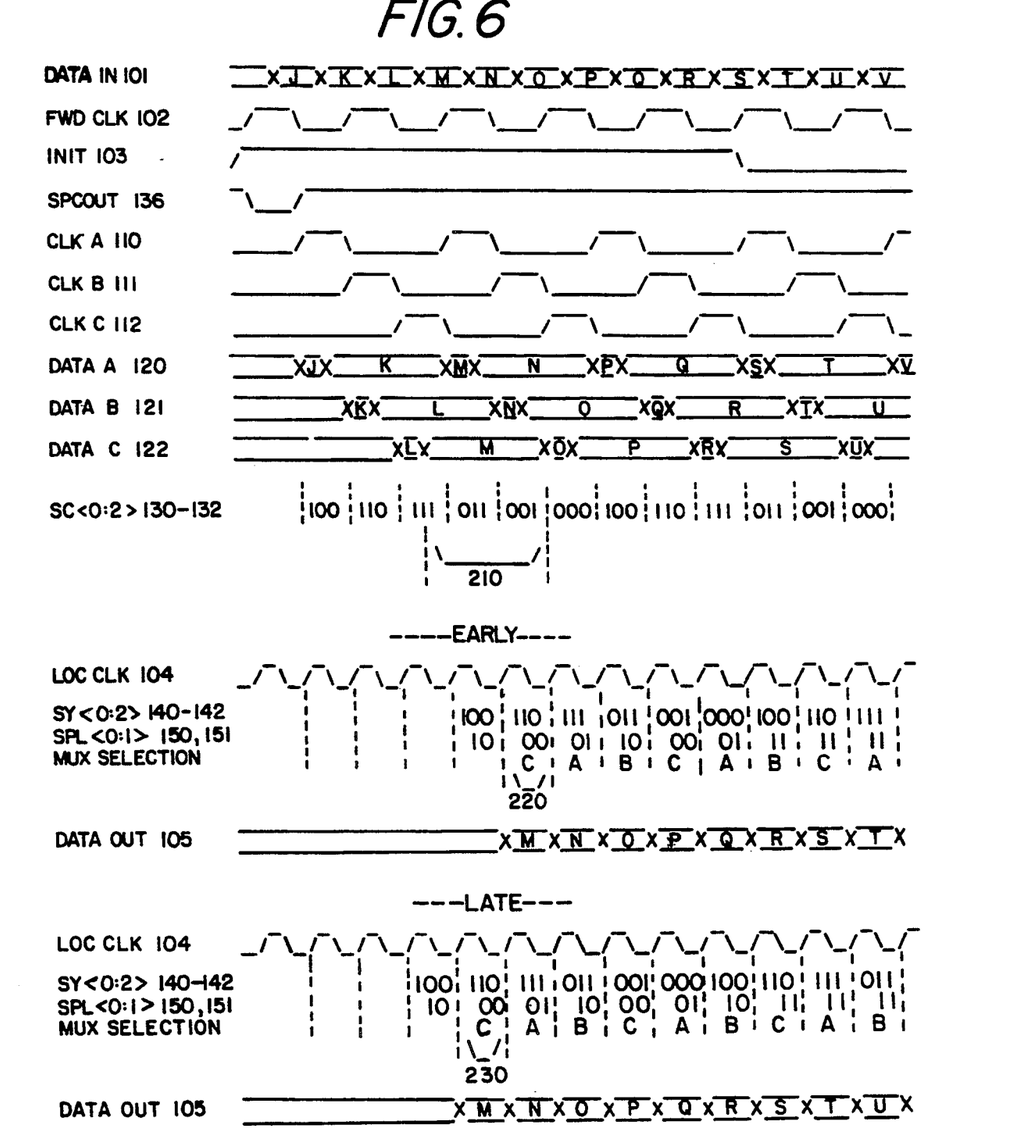
FIG. 6 is a timing diagram illustrating the operation of the circuit of the present invention.

The description of how the exemplary embodiment of the receiving circuit shown in FIG. 2 realigns synchronous data to a skewed local clock, will now be discussed in greater detail with reference to FIGS. 2–5 as well as the timing diagram of FIG. 6. FIG. 6 shows a subset of signals involved in the operation of the receiving circuit 10. In particular, FIG. 6 shows how the receiving circuit 10 is initialized, in accordance with the present invention, to guarantee accurate data realignment. Moreover, it illustrates how the circuit operates under two extreme timing scenarios, labelled EARLY and LATE. As will be discussed below, the scenario that applies depends upon the phase relationship between the forwarded and local clocks.

As shown in FIG. 6, when INIT 103 is first asserted, the single pulse circuit 36 generates a low pulse at its output. The signal at the output of the single pulse circuit 36 is shown in FIG. 6 as SPCOUT 136. The low pulse begins upon the first transition of FWD CLK 102 following the assertion of INIT 103, and ends upon the next transition of FWD CLK 102. As indicated in the truth table of FIG. 3, this low pulse causes the ring counter 35 to be initialized with Q0 high, and Q1 and Q2 both low (i.e., 100). The actual state in which the ring counter 35 is initialized is not important as long as it is a legal state. An alternative would be to use a self-initializing ring counter which is guaranteed to be in a legal state within a certain number of cycles. Once SPCOUT 136 returns to its normally high state, the ring counter 35 resumes free-running operation, proceeding from the state in which it was initialized.

As shown in FIG. 3, only one of the ring counter 35 outputs Q0, Q1, and Q2 is ever high at any one time. With each transition of FWD CLK 102, the position of the output that is high is rotated one step at a time, i.e., 100, 010, 001, 100, 010, . . . . Each output of the ring counter 35, therefore, clocks its respective latch 21–23 every third transition of FWD CLK 102. This is depicted in FIG. 6 by the signals CLK A 110, CLK B 111, and CLK C 112. Thus, as each bit of data is received via DATA IN 101, it is clocked into one of the latches 21–23. As shown in FIG. 6 by the signals DATA A 120, DATA B 121, and DATA C 122, each latch clocks in every third data bit received and holds it for a nominal three half-cycles of FWD CLK 102. Thus, for instance, bit M of DATA IN 101 is captured by latch C 23 which is in the process of being clocked by CLK C 122 when DATA IN 101 transitions to bit M. DATA C 122 remains stable in the state of bit M until latch C 23 is clocked again by CLK C 112.

In order to guarantee that data is accurately captured in latches 21–23, the phase relationship between DATA IN 101 and FWD CLK 102, as measured at the receiving circuit 10, must be such that the falling edges of the signals CLK A–C 110–112 occur while DATA IN 101 is stable, with some margin for the setup and hold times of the latches. In order to ensure that this condition is met, the propagation delays experienced by DATA IN 101 and FWD CLK 102 are assumed to be matched to the extent that the skew between these two signals is within half of a FWD CLK cycle, less setup and hold times. FIG. 6 illustrates an intermediate case where each transition of FWD CLK 102 occurs approximately in the middle of each bit period.

While the latches 21–23 are capturing incoming data in a rotating order, the ring counter 60 causes the multiplexer 70 to sequentially select, also in a rotating order, the outputs of the latches 21–23, i.e., DATA A–C 120–122. This is depicted in FIG. 6 by the rows labelled MUX SELECTION, with A, B, and C representing the latch A–C 21–23 whose output is being selected. The rate at which the ring counter 60 causes the multiplexer 70 to rotate through the outputs of the latches 21–23 must be the same as the rate at which the ring counter 35 causes the latches 21–23 to clock in data. Since LOC CLK 104 is twice the frequency of FWD CLK 102, the divide-by-2 circuit 65 is used to clock the ring counter 60 at the same rate at which the ring counter 35 is clocked. The divide-by-2 circuit 65 is implemented so that its output transitions on each rising edge transition of its input. Note that the divide-by-2 circuit 65 is not needed if the ring counter 65 is a single-edge triggered device. Using the divide-by-2 circuit 65 allows using the same type of ring counter for both the ring counters 35 and 60.

As each output of the latches A–C 21–23 is selected by the multiplexer 70, the state of the output selected is presented to the data input of the latch 80 for a window of time defined by two consecutive rising edges of LOC CLK 104. The data presented at the output of the multiplexer 70 is latched by latch 80 upon the falling edge of LOC CLK 104 which occurs nominally at the middle of the aforementioned time window. The signal at the output of latch 80 is DATA OUT 105, the data resynchronized to the local clock. This signal could then be used by the remainder of the receiving subsystem 3 which is clocked by LOC CLK 104.

In order to ensure the proper realignment of incoming data to the local clock, the ring counter 60 must control multiplexer 70 to select each of the latch 21–23 outputs while they are stable. This requires establishing the proper phase relationship between the rotational sequence in which the latches 21–23 are clocked and the rotational sequence in which the multiplexer 70 selects each output of the latches 21–23. As mentioned above, this phase relationship is established during the initialization of the receiving circuit 10; i.e., while INIT 103 is asserted. When the circuit enters normal operation, the correct phase relationship between the two rotational sequences is maintained for as long as the phase relationship between FWD CLK 102 and LOC CLK 104 remains substantially constant.

While INIT 103 is asserted, and afterwards, the latches 21–23 constantly capture data in a rotating sequence, as described above. At the same time, the ring counter 35 causes the status code generator 30 to rotationally sequence through a three-bit Gray code. A Gray code has the characteristic that consecutive states differ in only one bit. A three-bit Gray code would thus consist of six legal states, i.e., 000, 001, 011, 111, 110, and 100. The outputs of the status code generator 30, SC<0:2> 130–132, indicate which of latches 21–23 is currently capturing data. FIGS. 4 and 6 show what states the status code generator outputs are in while each of the latches A–C 21–23 is capturing data. Thus, for instance, when SC0, SC1 and SC2 are 000 or 111, latch C 23 is in the process of capturing data. Other sequences can be used for this purpose; however, as explained below, using a Gray code sequence minimizes errors. The status code generator 30 also has the useful property of self-initialization. If it powers up in an illegal state, i.e., 010, or 101, it is guaranteed to enter a legal state within one rotation.

The synchronizer 40 synchronizes the status generator 30 outputs to LOC CLK 104. The flip-flops 41–43 capture the outputs of the status code generator 30 upon each rising edge of LOC CLK 104. Because the phase relationship between FWD CLK 102 and LOC CLK 104 is unknown, there is no assurance that a transition of the status code generator outputs SC<0:2> 130–132 will not occur simultaneously with a rising edge of LOC CLK 104; i.e., there is no guarantee that the setup and hold times of the flip-flops 41–43 will be met. There is a finite possibility that a flip flop which is clocked at the same time that its data input is transitioning may become metastable, causing its output to oscillate before settling in its new state. This tendency will depend on the flip flop design and how closely the transitions of the data and clock inputs overlap. To ensure proper operation of the circuit, the possibility of such oscillations on the synchronizer 40 outputs, SY<0:2> 140–142, is minimized by including additional ranks of flip flops, 44–46 and 47–49, in series with the first rank 41–43. The number of ranks that are actually used will depend on the tolerable error rate for a desired level of system performance. Moreover, using a Gray code sequence for the status code generator 30 further reduces the possibility of error since only one of the status code generator outputs can transition at any one time.

Each rank of flip-flops that is used in the synchronizer 40, however, introduces a delay of one cycle of LOC CLK 104. The output signals of the synchronizer, SY<0:2> 140–142, reflect the outputs of the status code generator 30, SC<0:2> 130–132, three LOC CLK cycles prior.

The unknown phase relationship between FWD CLK 102 and LOC CLK 104 also introduces an uncertainty of up to one LOC CLK cycle in synchronizing the status code generator 30 outputs to LOC CLK 104. The maximum uncertainty is depicted by the two timing scenarios, EARLY and LATE, shown in FIG. 6. In the first scenario, LOC CLK 104 is assumed to be early relative to FWD CLK 102; i.e., the phase relationship between the two clocks is such that each rising edge of LOC CLK 104 occurs just prior to each transition of the status code generator outputs SC<0:2> 130-132. More precisely, each rising edge of LOC CLK 104 precedes each transition of SC<0:2> 130-132 by the hold time of flip-flops 41-43. In the second scenario, LOC CLK 104 is late relative to FWD CLK 102; i.e., each rising edge of LOC CLK 104 follows each transition of SC<0:2> 130-132 by the setup time of flip-flops 41-43. As shown in FIG. 8, the synchronizer output signals SY<0:2> 140-142 can be shifted by up to one LOC CLK cycle (less setup and hold times) depending on which scenario applies. This in turn will affect signals in stages following the synchronizer 40.

During initialization, i.e., while INIT 103 is asserted, the state prediction logic 50 initializes the ring counter 60 in accordance with the outputs of the synchronizer 40. The truth tables of FIGS. 3 and 5, considered together, indicate how the ring counter 60 is to be initialized for a given output state of the synchronizer 40. FIG. 6 shows the states of the state prediction output signals SPL<0:1> 150, 151 for both early and late timing scenarios. The state prediction logic 50 is implemented to initialize the ring counter 60 so that the time window during which one of the data receiver 20 outputs is selected by multiplexer 70, falls within the nominal three half-cycle period during which that output is stable. FIG. 6 shows which latch A-C 21-23 output is selected for a given state of the state prediction logic outputs. Note that the actual logic to be implemented will depend on the number of cycles delay introduced by the synchronizer 40. Note further that if the state prediction logic 50 receives an illegal Gray code, i.e., 010 or 101, the ring counter 60 will momentarily re-enter free-running operation and increment from the last valid code received.

As can be seen from FIG. 6, the uncertainty introduced by the asynchronicity of FWD CLK 102 and LOC CLK 104 is propagated through to the stages following the synchronizer 40. As shown by the early and late timing scenarios, the time window during which multiplexer 70 selects a data receiver output signal, DATA A-C 120-122, can occur approximately during one of two contiguous cycles of LOC CLK 104. In determining how to initialize the ring counter 60 to guarantee that the multiplexer 70 is always selecting a stable data receiver 20 output, another source of uncertainty must also be taken into account; i.e., the uncertainty that is due to the unknown, although bounded, phase relationship between DATA IN 101 and FWD CLK 102.

Referring again to FIG. 6, consider, for instance, a period 210 during which DATA C 122 is stable in the state of bit M. This period extends approximately, from the L and M bit boundary on DATA IN 101 to the next rising edge of CLK C 112. Depending on the phase relationship between DATA IN 101 and FWD CLK 102, this period can nominally be as long as three half-cycles and as short as two half-cycles of FWD CLK 102. FIG. 6 shows an intermediate case where the period 210 is 2.5 half-cycles wide. At either extreme, the period 210 will be wide enough to accommodate the worst-case uncertainty introduced by the asynchronicity of FWD CLK 102 and LOC CLK 104. Moreover, if the state prediction logic 50 is implemented as defined by the truth table of FIG. 5, and as depicted in FIG. 6, the phase relationship between the multiplexer selection window and the stability of data at the data receiver 20 outputs cannot be worse than that shown for a window 220, i.e., where the data receiver 20 output transitions simultaneously with the end of the window during which the multiplexer 70 was selecting that output. As can be seen in FIG. 6, even in this worst case, DATA C 122 is stable for the entire duration of the window 220.

If the early scenario applied, i.e., the window 220 represented the relevant sampling period, and FWD CLK 102 were shifted to the left of its position shown in FIG. 6, the late scenario would then apply and a window 230 would represent the new relevant sampling period. Even though the period 210 would be narrowed, there would be ample margin surrounding the window 230 to guarantee data stability. If the early scenario applied and FWD CLK 102 were shifted to the right, the early scenario would still apply, the period 210 would be widened and a margin would be introduced to the right of the window 220. Therefore, as demonstrated, by implementing the state prediction logic 50 in accordance with the truth table of FIG. 5, the multiplexer 70 is guaranteed to always be selecting a latch output 120-122 while that output is stable.

Note that greater timing margin can be had by widening the period 210. This can be achieved by increasing the number of latches used in the data receiver 20 to more than three. This, however, would require a corresponding increase in complexity in the rest of the receiving circuit 10.

As indicated by the truth tables of FIGS. 3 and 5, and as depicted in FIG. 6, when INIT 103 is deasserted, the ring counter 60 resumes normal, free-running operation starting from the state in which it was initialized. Note that in order to ensure proper initialization of subsystem 10, INIT 103 must be asserted long enough to guarantee that the status code generator 30 has self-initialized and that the first valid state has been shifted through the synchronizer 40 to the state prediction logic 50 and held there for one LOC CLK cycle, i.e., long enough to initialize the ring counter 60. With the correct phase relationship thus established during initialization between the two ring counters 35 and 60, the multiplexer 70 will always select a data receiver 20 output while that output is stable. Multiplexer 70 is thus guaranteed to present a stable signal at its output that meets the setup and hold times of latch 80, which when clocked by LOC CLK 104 presents a data signal, DATA OUT 105, that is realigned to the local clock of the receiving subsystem 3.

It should be apparent that several variations and modifications of the exemplary embodiment are possible beyond those already discussed.

For instance, the receiving circuit 10 can readily be modified to operate with different clocking schemes, as where, for instance, bit boundaries on DATA IN 101 are indicated by full cycles of FWD CLK 102, as opposed to half-cycles as discussed above. In that case, the ring counters can be single-edge triggered.

Furthermore, the state devices used in the present invention can be either latches or flip-flops with either positive or negative logic clocking. For instance, the data receiver 20 and the status code generator 30 can be implemented with flip-flops instead of latches. Some minor modification of the clocking signals may, however, be required.

It should also be apparent that certain functional blocks can be implemented in a variety of ways. Multiplexer 70 can be replaced with a standard 4-to-1 multiplexer with one unused data input and two select inputs.

Accordingly, ring counter 60 can be replaced with a 2-bit counter which counts in a 3-state sequence. State prediction logic 50 can be implemented several ways. One possibility is to use two 8-to-1 multiplexers, one for each output. This allows the logic implemented to be readily altered by changing the states of the multiplexer data inputs.

Note further that parts of the circuit can be readily replicated to support parallel, multi-bit data reception. For instance, DATA IN 101 can consist of an N-bit bus of data lines. The latches 21–23 can be replaced with N-bit registers and the multiplexer 70 and latch 80 can be replicated for each data line.

What is claimed is:

1. A circuit for receiving data, which comprises:
   inputs for receiving a first clock signal, a second clock signal, an initialization signal, and an incoming data signal, the incoming data signal comprising a series of data items;
   a plurality of receiving state devices, each having a data input, each data input being coupled to the incoming data signal, a control input, and a data output;
   a multiplexer having a plurality of data inputs, each data input being coupled to the data output of one of the plurality of receiving state devices, control inputs, and an output;
   control logic, said control logic comprising:
      a status code generator having a plurality of outputs,
      a first rotating logic block having a clock in-put coupled to the first clock signal, a control input coupled to the initialization signal, and control outputs, each control output being coupled to a preselected respective one of the control inputs of the plurality of receiving state devices,
      a synchronizer having a plurality of data inputs, each data input being coupled to a preselected respective one of the plurality of outputs of the status code generator, a clock input coupled to the second clock signal, and a plurality of data outputs,
      a second rotating logic block having a clock input coupled to the second clock signal, control inputs, and control outputs, each control output being coupled to a preselected respective one of the control inputs of the multiplexer;
      sate prediction logic having a control input coupled to the initialization signal, a plurality of data inputs, each data input being coupled to a preselected respective one of the plurality of data outputs of the synchronizer, and control outputs, each control output being coupled to a preselected respective one of the control inputs of the second rotating logic block,
   the first rotating logic block generating a plurality of receive control signals in response to the first clock signal and the initialization signal;
   the status code generator generating a plurality of status signals indicating which of the plurality of receiving state devices is capturing data;
   the synchronizer generating a plurality of synchronized status signals in response to the second clock signal;
   the state prediction logic generating rotating logic control signals in response to the plurality of synchronized status signals and the initialization signal;
   the second rotating logic block generating a plurality of multiplexer control signals in response to the rotating logic control signals and the second clock signal;
   the plurality of receiving state devices being sequentially controlled by the plurality of receive control signals to capture the series of data items;
   the multiplexer sequentially selecting its data inputs to pass the series of data items available at the outputs of the plurality of receiving state devices to the multiplexer output under the control of the plurality of multiplexer control signals.

2. The circuit of claim 1, wherein the first clock signal has a first propagation delay and the second clock signal has a second propagation delay, the difference between the first and second propagation delays being unlimited.

3. The circuit of claim 1, further comprising a final state device having a data input coupled to the output of the multiplexer, and a control input coupled to the second clock signal, the final state device capturing the data items from the multiplexer output under the control of the second clock signal.

4. The circuit of claim 1, wherein the first and second rotating logic blocks comprise ring counters.

5. The circuit of claim 1, wherein:
   the incoming data signal comprises N parallel data bit signals,
   the receiving state devices comprise N parallel state devices, and
   the multiplexer comprises N parallel multiplexers, where $N \geq 2$.

6. The circuit of claim 1, wherein two data items are received for each cycle of the first clock signal.

7. The circuit of claim 1, wherein the second clock signal has a frequency that is twice the frequency of the first clock signal.

8. The circuit of claim 1, wherein the plurality of receiving state devices comprises at least three state devices.

9. The circuit of claim 1, wherein the status code generator comprises a Gray code generator.

10. The circuit of claim 4, wherein the control logic further comprises a single pulse circuit having control inputs coupled to the initialization signal and the first clock signal, and a control output coupled to the control input of a first one of said ring counters, the single pulse circuit generating a momentary pulse proximally following a transition of the initialization signal.

11. The circuit of claim 1, wherein the synchronizer further comprises at least one rank of state devices.

12. The circuit of claim 11, wherein the state devices are flip-flops.

13. The circuit of claim 1, wherein the control logic further comprises a divide-by-two circuit having a clock input coupled to the second clock signal, and a clock output coupled to the clock input of the second rotating logic block.

14. A system for transferring data which comprises:

a transmitting subsystem;
a receiving subsystem comprising:
 a circuit for receiving data, comprising:
  inputs for receiving first clock signal, a second clock signal, an initialization signal, and an incoming data signal, the incoming data signal comprising a series of data items,
  a plurality of receiving state devices, each having a data input, each data input being coupled to the incoming data signal, a control input, and a data output,
  a multiplexer having a plurality of data inputs, each data input being coupled to the data output of one of the plurality of receiving state devices, control inputs, and an output,
  control logic, said control logic comprising:
   a status code generator having a plurality of outputs,
   a first rotating logic block having a clock input coupled to the first clock signal, a control input coupled to the initialization signal, and control outputs, each control output being coupled to a preselected respective one of the control inputs of the plurality of receiving state devices,
   a synchronizer having a plurality of data inputs, each data input being coupled to a preselected respective one of the plurality of outputs of the status code generator, a clock input coupled to the second clock signal, and a plurality of data outputs,
   a second rotating logic block having a clock input coupled to the second clock signal, control inputs, and control outputs, each control output being coupled to a preselected respective one of the control inputs of the multiplexer;
   state prediction logic having a control input coupled to the initialization signal, a plurality of data inputs, each data input being coupled to a preselected respective one of the plurality of data outputs of the synchronizer, and control outputs, each control output being coupled to a preselected respective one of the control inputs of the second rotating logic block,
  the first rotating logic block generating a plurality of receive control signals in response to the first clock signal and the initialization signal;
  the status code generator generating a plurality of status signals indicating which of the plurality of receiving state devices is capturing data;
  the synchronizer generating a plurality of synchronized status signals in response to the second clock signal;
  the state prediction logic generating rotating logic control signals in response to the plurality of synchronized status signals and the initialization signals;
  the second rotating logic block generating a plurality of multiplexer control signals in response to the rotating logic control signals and the second clock signal;
 a clock path coupling the transmitting and receiving subsystems for transmitting the first clock signal from the transmitting subsystem to the receiving subsystem;
 a data path coupling the transmitting and receiving subsystems for transmitting the incoming data signal from the transmitting subsystem to the receiving subsystem;
 the plurality of receiving state devices being sequentially controlled by the plurality of receive control signals to capture the series of data items;
 the multiplexer sequentially selecting its data inputs to pass the series of data items available at the outputs of the plurality of receiving state devices to the multiplexer output under the control of the plurality of multiplexer control signals.

15. The system of claim 14, further comprising a final state device having a data input coupled to the output of the multiplexer, and a control input coupled to the second clock signal, the final state device capturing the data items from the multiplexer output under the control of the second clock signal.

16. The system of claim 14, wherein the data and clock paths have unlimited propagation delays.

17. The system of claim 14, further comprising an initialization signal generator for generating the initialization signal.

18. The system of claim 17, wherein the initialization signal generator comprises a bit-error detector.

19. A method for receiving data, comprising the steps of:
 (a) receiving a first and second clock signal, an initialization signal and an incoming data signal, the incoming data signal comprising a series of data items;
 (b) sequentially controlling, in response to the first clock signal and the initialization signal, a plurality of receiving state devices to capture the series of data items;
 (c) sequentially controlling, in response to the first and second clock signals and the initialization signal, a multiplexer to pass each of the data items captured by the plurality of receiving state devices to an output of the multiplexer, said step of sequentially controlling a multiplexer further comprising the steps of
  (1) generating a plurality of status signals indicating which of the plurality of receiving state devices is capturing data;
  (2) synchronizing the plurality of status signals to the second clock signal;
  (3) determining a multiplexer initialization state in response to the plurality of status signals synchronized to the second clock signal;
  (4) sequentially controlling the multiplexer starting from the multiplexer initialization state.

20. The method of claim 19, further comprising the step of:
 (d) controlling, with the second clock signal, a final state device coupled to the output of the multiplexer, to capture each of the data items passed from the multiplexer.

21. The method of claim 19, wherein:
 the incoming data signal comprises N parallel data bit signals,
 the receiving state devices comprise N parallel state devices, and
 the multiplexer comprises N parallel multiplexers, where $N \geq 2$.

22. The method of claim 19, wherein the step of receiving the incoming data signal comprises receiving two data items for each cycle of the first clock signal.

23. The method of claim 19, wherein the second clock signal has a frequency that is twice the frequency of the first clock signal.

24. The method of claim 19, wherein the plurality of receiving state devices comprises at least three state devices.

25. The method of claim 19, wherein the step of generating a plurality of status signals further comprises generating a Gray code.

26. The method of claim 19, further comprising the step of generating the initialization signal.

27. The method of claim 26, further comprising the step of detecting bit-errors prior to generating the initialization signal.

* * * * *